April 1, 1930.  H. STACKS  1,753,031
DETACHABLE VEHICLE TOP
Filed Aug. 30, 1928
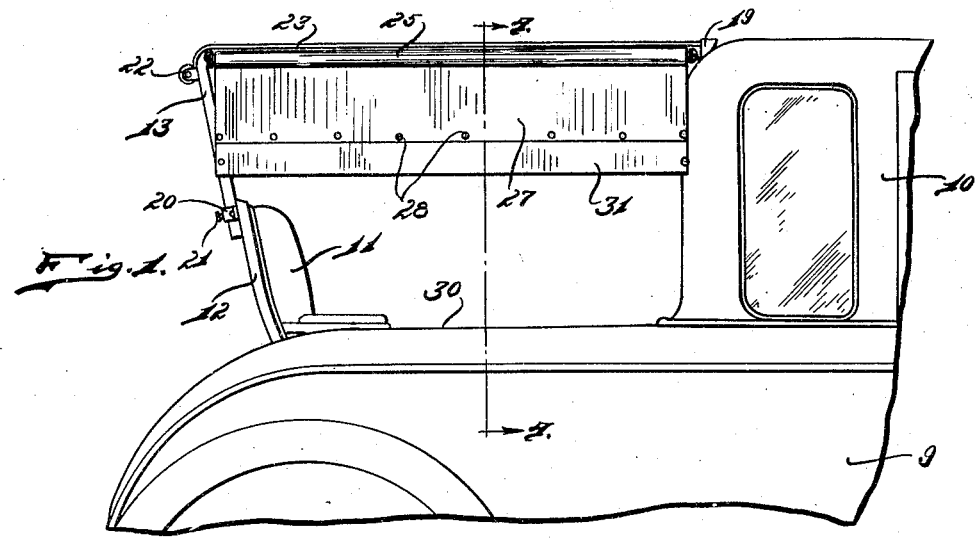
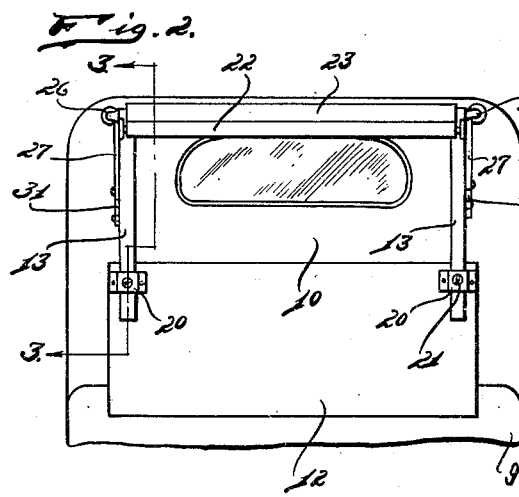
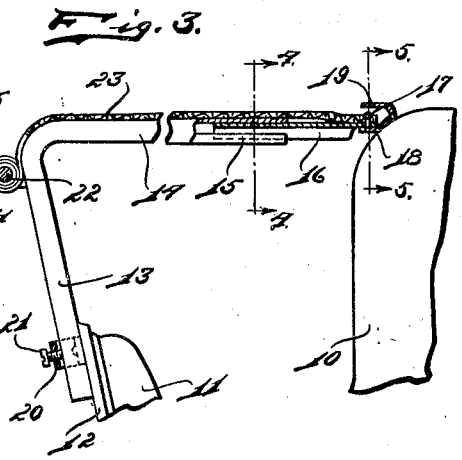
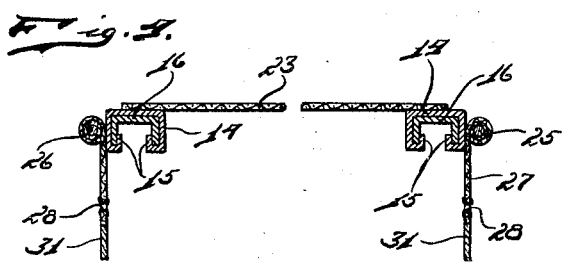
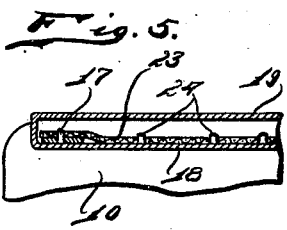
INVENTOR.
Homer Stacks.
BY
Thos. Donnell
ATTORNEY.

Patented Apr. 1, 1930

1,753,031

UNITED STATES PATENT OFFICE

HOMER STACKS, OF DETROIT, MICHIGAN

DETACHABLE VEHICLE TOP

Application filed August 30, 1928. Serial No. 302,926.

My invention relates to a new and useful improvement in a detachable vehicle top adapted for use as a canopy over the rumble seat which is commonly mounted on vehicle bodies rearwardly of a cupola.

It is an object of the present invention to provide a detachable vehicle top which may be quickly and easily mounted in position and which may be folded into compact form when not in use.

Another object of the invention is the provision of a top of this class which will be simple in structure, economical of manufacture and durable and highly efficient in use.

Another object of the invention is the provision in a top of this class of side curtains which may be easily and quickly moved to operative or inoperative position.

Another object of the invention is the provision of a supporting frame which is adjustable to accommodate various sized vehicles.

Other objects will appear hereinafter.

The invention consists in the combination and arrangement of parts hereinafter described and claimed.

The invention will be best understood by a reference to the accompanying drawings which form a part of this specification, and in which, Fig. 1 is a side elevational view of the invention showing it applied.

Fig. 2 is a rear elevational view of the invention applied.

Fig. 3 is a fragmental sectional view taken on line 3—3 of Fig. 2.

Fig. 4 is a fragmental sectional view taken on line 4—4 of Fig. 1 or Fig. 3.

Fig. 5 is a fragmentary sectional view taken on line 5—5 of Fig. 3.

In the drawings I have illustrated the invention applied to a vehicle body 9 on which is mounted a fixed body top 10 and rearwardly of which is a rumble seat 11 having a rigid back 12.

The frame of the invention is the same at opposite sides of the seat so that a description of one side will suffice for both. An upright 13 is angularly turned to provide a horizontally extending portion 14, the strip of material from which the portions 13 and 14 are made being preferably channel iron and the edges 15 of the portion 14 being inwardly turned, as shown in Fig. 4, to overlap the downwardly projecting edges of a channel iron section 16 which is fastened to the body top 10 by suitable studs 17 projecting upwardly therefrom. These studs extend over a strip of metal 18 which has the doubled over portion 19 to serve as a watershed. Eyelets 20 are mounted on the back 12 and a suitable setscrew 21 serves to determine the vertical position of the support 13 in the eyelets 20. Mounted on the rear of the supports 13 below the top thereof and extending transversely thereof so as to connect the oppositely positioned members 13 is a shade roller 22, having the shade 23 wound thereon. The shade 23 at its forward edge is adapted for receiving studs or snap fasteners 24 which are carried on the plate 18 so that the shade 23 is held in taut condition when in use while at the same time it may be easily and quickly released for rolling on the roller 22. Shade rollers 25 and 26 are mounted on the outer edges of the horizontally extending portions 14. On each of these shade rollers 25 and 26 is a shade 27 having openings 28 formed therein for engagement with the studs 29 which are mounted on the sides 30 of the seat so that the seats may be enclosed by the shade. The free edge of each of the shades 27 is provided with a reinforcing strip 31 so that durability is afforded in a device of this kind.

By forming the member 16 and the portion 14, telescoping as illustrated, the frame forming portions are adapted for use on various models and sizes of cars so that a universal frame is thus afforded. By a vertical adjustment of the supports 14 in the eyelets 20 the head-room may be varied, and an easy method of detaching is afforded for entry of the occupants into the seat.

While I have illustrated and described the preferred form of my invention, I do not wish to limit myself to the precise details of structure shown, but desire to avail myself of such variations and modifications as come within the scope of the appended claim.

Having thus described my invention, what

I claim as new and desire to secure by Letters Patent is:

In a detachable seat top of the class described adapted for use with a vehicle body having a fixed top and a seat back positioned rearwardly thereof: a transversely extending member mounted on the upper surface of said fixed top adjacent its rear side formed substantially U-shaped in cross section and opening toward the rear; a plurality of spaced studs projecting upwardly from the upper surface of the lower side of said member; a rearwardly projecting supporting member at the opposite ends of said transversely extending member; and a curtain supporting member telescoping with said rearwardly projecting members; and a curtain stretchable over said members, said curtain being secured at its forward edge to said studs, the edge of said curtain lying in the channel of said U-shaped member.

In testimony whereof I have signed the foregoing specification.

HOMER STACKS.